Figure 1:
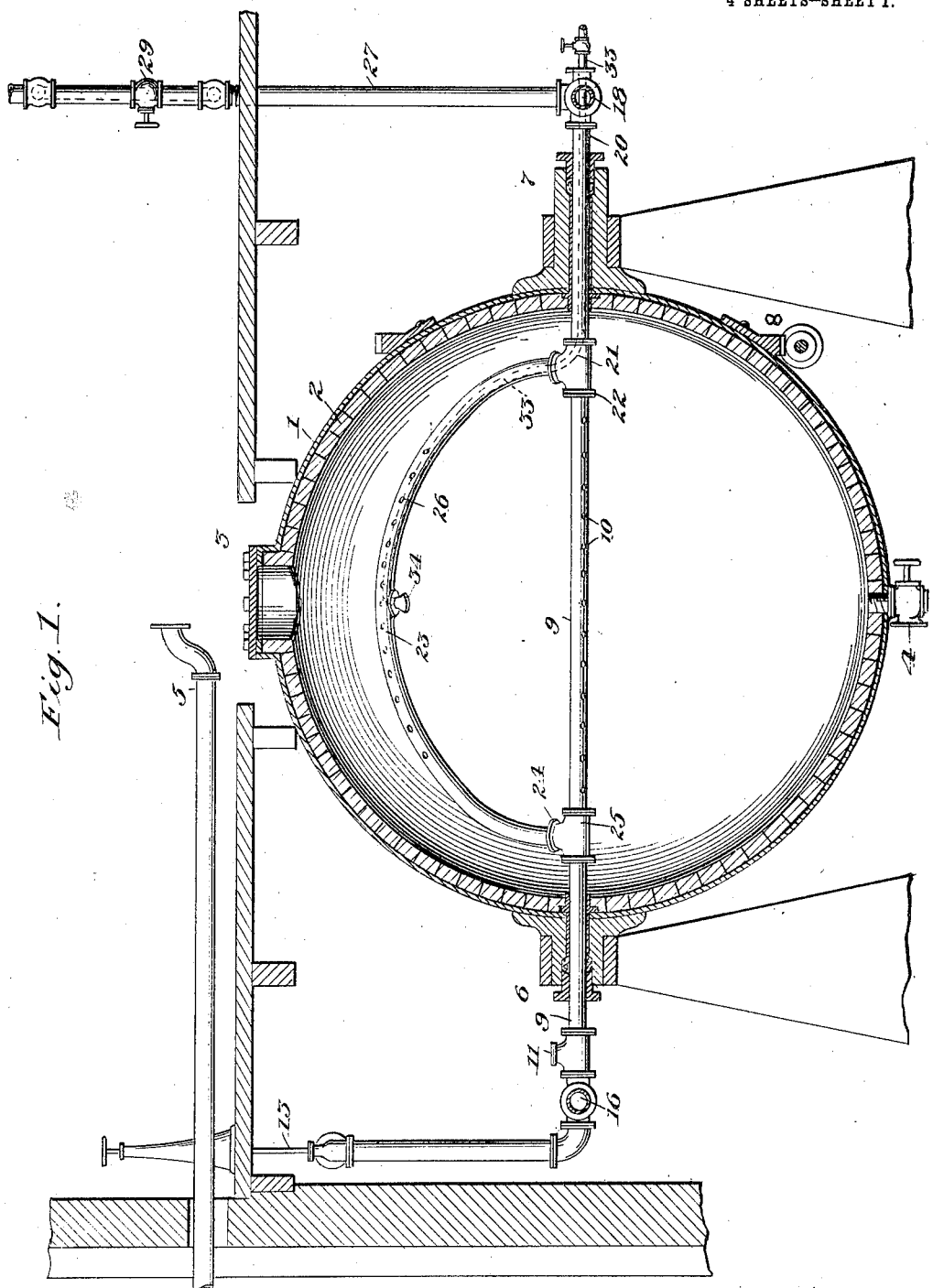

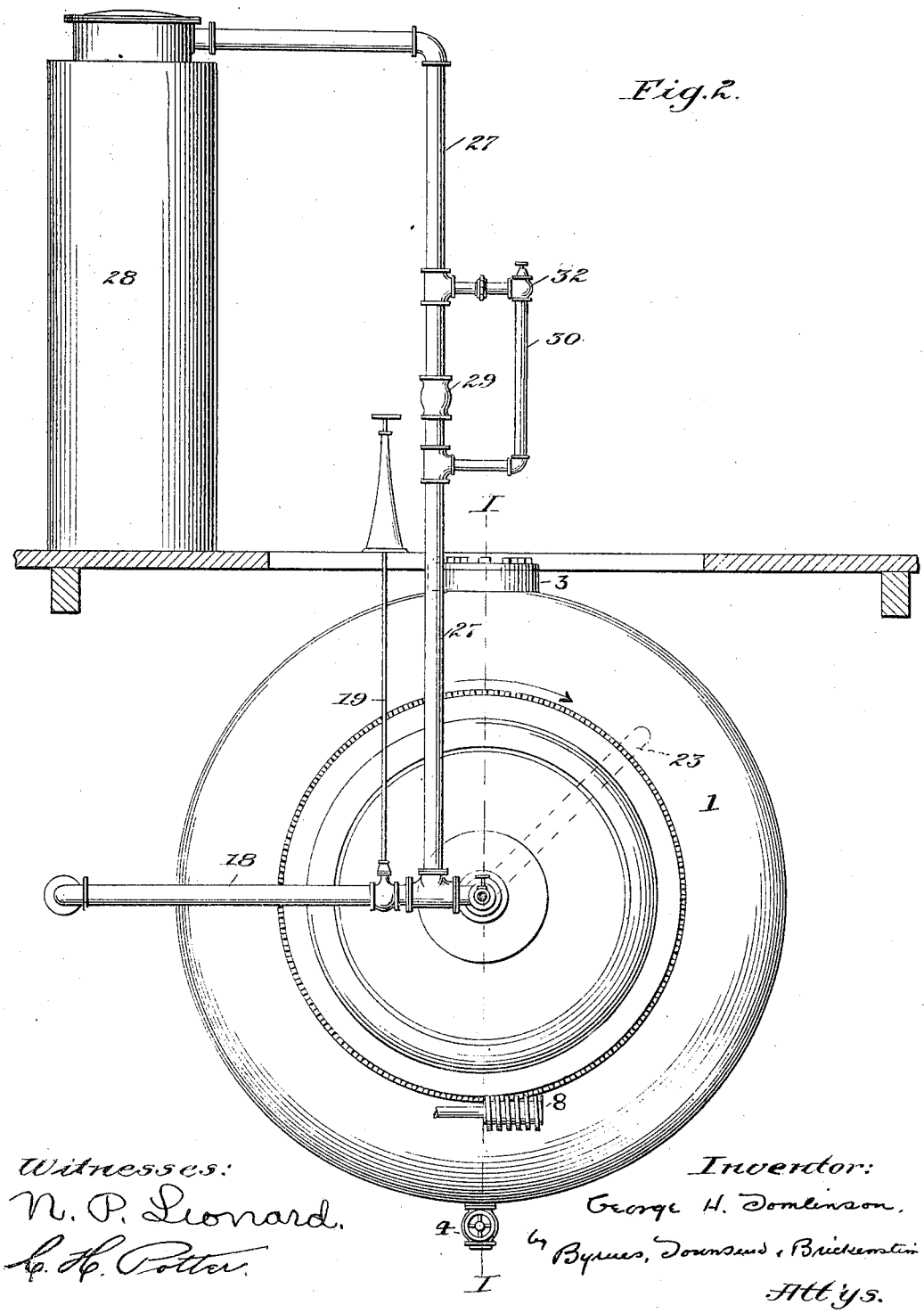

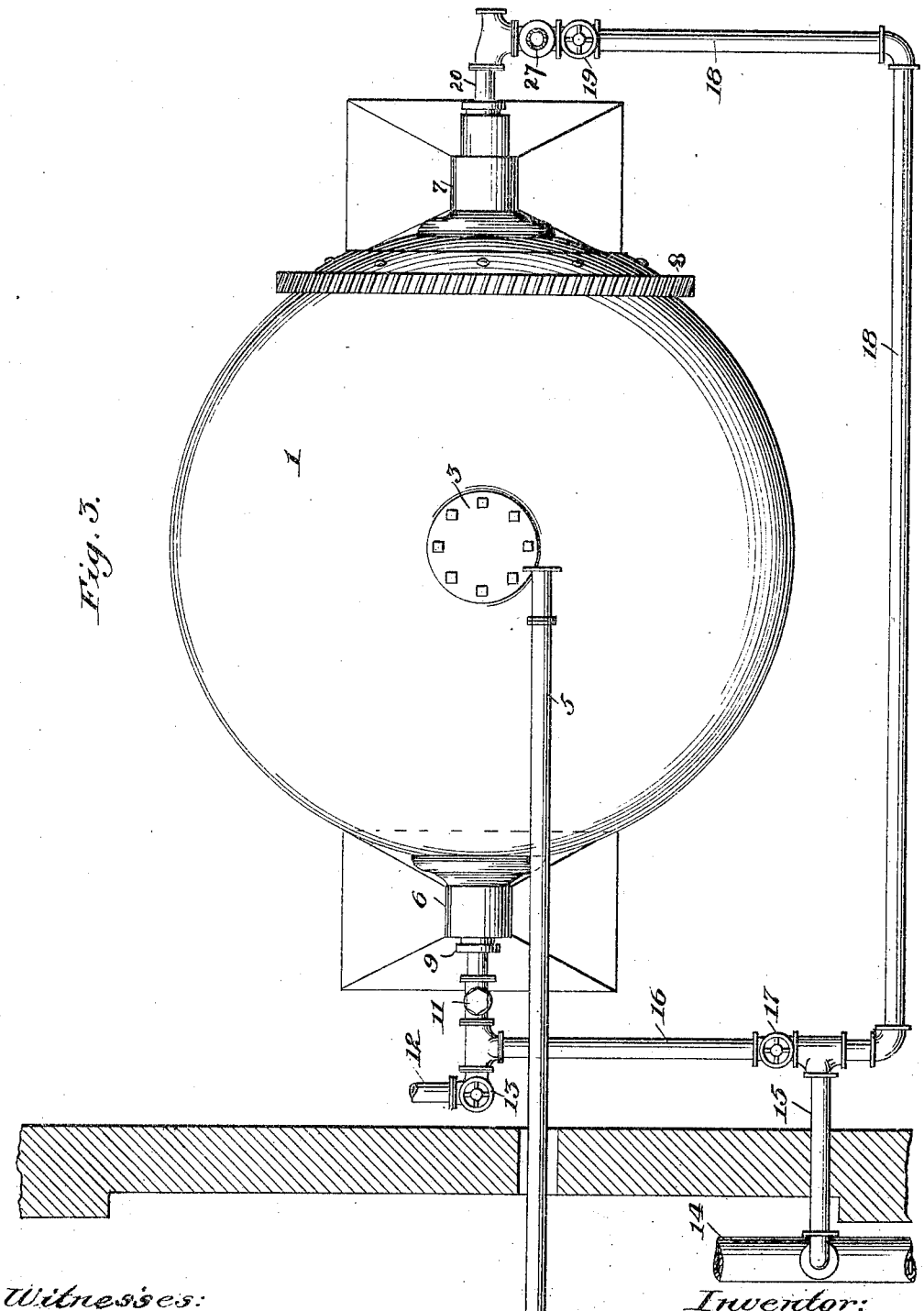

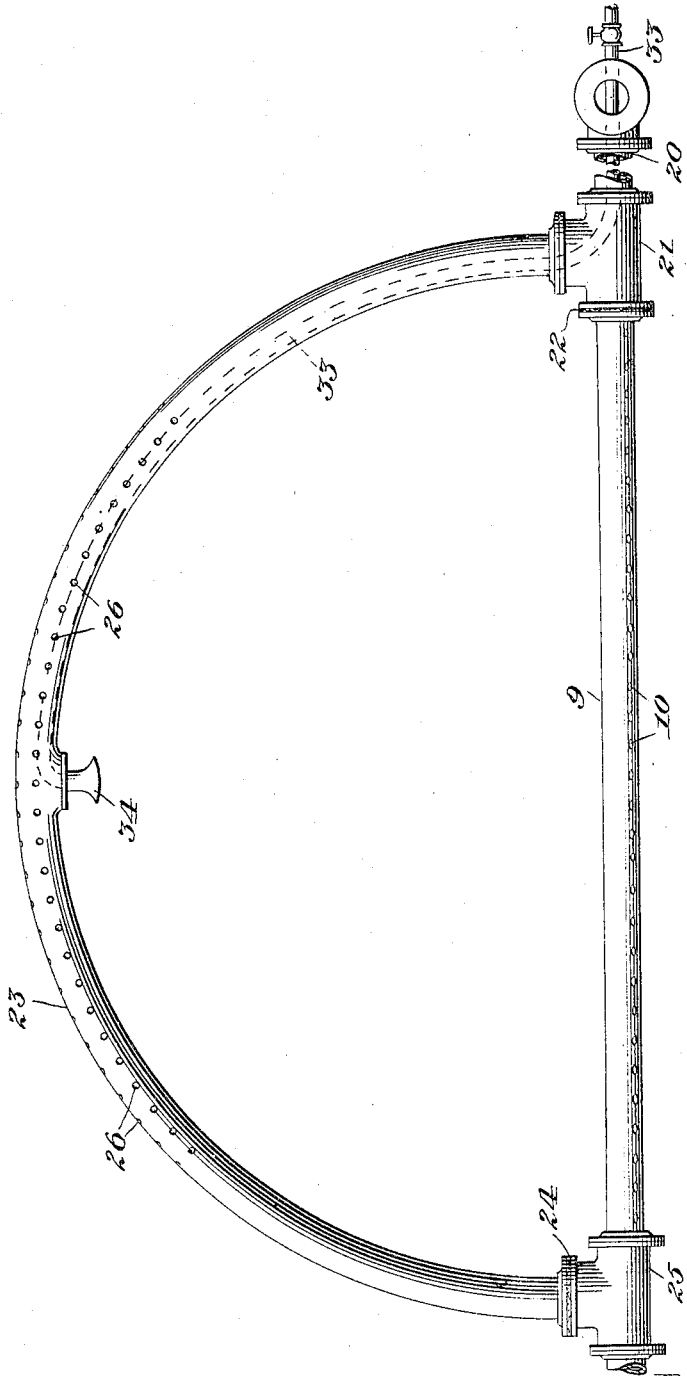

UNITED STATES PATENT OFFICE.

GEORGE H. TOMLINSON, OF CHICAGO, ILLINOIS, ASSIGNOR TO STANDARD ALCOHOL COMPANY, OF NEW YORK, N. Y., A CORPORATION OF MAINE.

APPARATUS FOR TREATING LIGNOCELLULOSE.

1,032,449.

Specification of Letters Patent. Patented July 16, 1912.

Application filed January 29, 1912. Serial No. 674,165.

*To all whom it may concern:*

Be it known that I, GEORGE H. TOMLINSON, a subject of the King of Great Britain, residing at Chicago, in the county of Cook and State of Illinois, have invented certain new and useful Improvements in Apparatus for Treating Lignocellulose, of which the following is a specification.

This invention relates to apparatus for treating ligno-cellulose or other cellulosic raw materials for the purpose of obtaining turpentine or other volatile products, and fermentable sugars.

For a full understanding of the invention, reference is made to the accompanying drawings, illustrating a preferred apparatus embodying the invention.

In said drawings: Figure 1 is a vertical central section of a preferred form of apparatus, on line I—I of Fig. 2, the steam and vapor conduits being shown in elevation; Fig. 2 is an elevation of the digester and its eduction connections, viewed from one end, the supporting columns being omitted for clearness of illustration; Fig. 3 is a plan view of the digester with its connections; and Fig. 4 is a detail view, on a larger scale, showing a preferred pipe arrangement within the digester.

In the drawings, 1 represents the sheet-metal body of the digester internally lined with acid-resisting brick 2, set in a suitable cement inert to the hydrolyzing agent used. For use with sulfuric or sulfurous acid a suitable cement may comprise a mixture of litharge and glycerin. The lining should be of substantial thickness and of a heat-insulating and heat-retaining character, in order that the charge may be digested by the aid of live steam admitted to the interior thereof, and the condensation so limited that the mass is maintained throughout the entire operation in an open, permeable and absorptive state, as more fully pointed out in my copending application, Ser. No. 664,373, filed Dec. 7, 1911.

The digester is provided with a manhole 3 for the introduction and discharge of the material, and with a blow-off cock 4, which in one position of the digester may be coupled with the blow-off pipe 5. The digester is mounted on hollow trunnions 6, 7 and is adapted for rotation by means of a worm-gear 8.

The preferred use of the apparatus involves the introduction of steam and a hydrolyzing agent into the digester, and the withdrawal of the vapors therefrom, without interrupting its movement of rotation. Connections permitting this mode of operation comprise, in the form of apparatus illustrated, a fixed pipe 9 extending through the hollow trunnion 6, axially disposed within the digester, and perforated as indicated at 10 for the admission of steam to the interior of the charge. This steam-pipe is provided with a check-valve 11, and is connected with a source of steam by pipe 12, controlled by a valve 13.

In practice, a plurality of similar digesters are usually employed, and means are preferably provided whereby any digester of the series may be blown off into other digesters which may be in condition to receive the steam or vapors therefrom. For this purpose, I provide a conduit 14, having similar connections to each digester of the series. As illustrated, such connections comprise a pipe 15, communicating with the steam-inlet pipe 9 at a point between the check-valve 11 and the control valve 13, by means of the pipe 16 fitted with a valve 17; and likewise communicating through pipe 18, having a valve 19, with the vapor-eduction pipe 20. This pipe 20 enters the digester through the hollow trunnion 7, and is in alinement with the steam-inlet pipe 9 and is attached thereto by a T connection 21, communication between the pipes 9 and 20 being interrupted by a blank flange 22.

23 is a curved vapor-eduction pipe, which is carried by the steam-inlet pipe 9 and by the vapor-eduction pipe 20, communicating with the latter through the T 21, but sealed from the pipe 9 by a blank flange 24 in the T connection 25. The pipe 23 arches upwardly into the vapor space of the digester, and is perforated therein as indicated at 26. As illustrated in Fig. 1, and indicated by dotted lines in Fig. 2, the pipe 23 extends upwardly from the axis of the digester at an angle of approximately 45° from the vertical. The result of this arrangement is that when the digester is rotated in the direction indicated by the arrow in Fig. 2, the pipe 23 lies substantially at a right angle to the inclined surface of the charge. It therefore not only extends to the maximum degree into the vapor space of the digester, but it is subject to the minimum strain due to the weight and pressure of the charge.

The pipe 20 communicates at a point outside the digester with a vapor-pipe 27 leading to a suitable condenser 28 for volatile products. In the pipe 27 I place a valve 29, and around this valve I arrange a vapor by-pass 30, provided with a pop-valve 32, which when properly set will serve to keep the pressure uniform, and thereby to avoid excessive temperatures.

The hydrolyzing agent is introduced into the digester through a valved pipe 33, which lies within the vapor-eduction pipes 20 and 23, and terminates in a spray-nozzle 34, located in the vapor space of the digester and directed toward the surface of the charge therein.

An illustrative procedure, when my apparatus is applied to the treatment of resinous woods, is as follows: The digester is charged with moist sawdust or wood-waste to such extent that the steam-inlet pipe 9 is covered, while the perforated portion of the arched eduction-pipe 23 is exposed. The digester is then closed and set in rotation, and steam is admitted under suitable pressure to the interior of the charge through the axial, perforated pipe 9, until the wood is brought to a temperature proper for the distillation of turpentine or similar volatile products, but below that at which any material decomposition of cellulose occurs, such decomposition at high temperatures resulting, as is well known, in the production of considerable quantities of acetic acid and tarry and phenolic bodies. For this purpose, a temperature not exceeding that of steam under a pressure of twenty to thirty pounds will usually suffice, and lower pressures may be used if desired. The valve 29 being opened, the turpentine and steam will flow through the perforations 26 into the pipe system 23, 20, 27, and thence to the condenser 28 where the turpentine and any accompanying volatile products will be recovered. This distillation is continued until the elimination of the turpentine is substantially complete. The steam-supply is then cut off, the eduction-valve 29 closed, and the hydrolyzing agent admitted into the digester through the spray-nozzle 34.

In the preferred mode of operation, the hydrolizing agent is supplied at a temperature materially below that of the wood, which has, by the treatment above described, been brought to a temperature above the vaporizing point of water. The moisture contained in the original sawdust, or introduced with the steam, exists at this temperature largely or wholly as vapor, which permeates the wood and fills the pores and interstices thereof; and the immediate effect of the introduction of the cold hydrolyzing agent is to bring about a partial or complete condensation of this vapor, with the result that a partial vacuum is formed within the digester, the effect being to secure a deeper, more intimate, and more rapid penetration of the hydrolyzing agent into the substance of the particles to be converted. Furthermore, the conditions render it possible to secure a very perfect admixture of the hydrolyzing agent with the material to be converted, since the hydrolyzing agent is discharged from above upon the surface of the sawdust, which, under the continued rotation of the digester, is caused to flow or fall in a continuous stream past the spray-nozzle 34. By proceeding as above I found it possible to secure a highly effective and intimate distribution of the hydrolizing agent through the sawdust, and I have further found that this intimate distribution results in a material increase in the percentage of fermentable sugars yielded by the subsequent digestion.

Preferably the hydrolyzing agent is introduced as an aqueous solution, as for example a solution of sulfuric, sulfurous or hydrochloric acid, at normal or lower temperatures. The amount of such solution is preferably sufficient to bring the acid concentration, based upon the total moisture-content of the material, to 0.2–0.5 per cent. When an acid solution is introduced as above described at a temperature materially below that of the wood-waste, it is possible that a materially-increased percentage of liquid may be supplied to the charge without saturating it to the limit of its absorptive capacity, by reason of the deeper penetration obtained. It is regarded as important that the total liquid-content of the charge, after the introduction of the hydrolyzing agent, should be less than is required for its complete saturation, in order that the mass may retain its open, permeable and absorptive condition throughout the subsequent steaming for the production of fermentable sugars; and a primary purpose of the described treatment is to secure the deep penetration of a limited proportion of a hydrolizing agent, as distinguished from the maximum saturation of the material with the converting agent. If the acid solution is to be introduced under a low hydrostatic head, it is necessary first to relieve the internal steam-pressure; or this steam-pressure may be maintained, the hydrolizing agent, either as gas or liquid, being forced into the digester at a corresponding pressure. In either case the condensation of steam will result in a rapid fall of the internal pressure, and preferably but not necessarily the conditions are so adjusted that the pressure within the digester will fall to a point below atmospheric. After a part or all of the hydrolyzing agent has been introduced into the digester and thoroughly incorporated with the charge, steam is again admitted through the pipe 9 and the temperature maintained at a degree proper for the conversion, for a suitable time. As a general rule, in the case of sawdust from coniferous woods, a temperature of 275° to 325° F., maintained for thirty to forty-five minutes, will suffice. The steam is then blown off and the digested material is leached for the extraction of fermentable sugars. The conditions of the process are such that the digested material is relatively hard, granular and non-absorptive, which qualities permit the leaching to be quickly effected in diffusion apparatus of standard type. The resulting solution may thereafter be fermented and distilled for the recovery of alcohol in accordance with know methods.

In case a plurality of digesters are operated, it is preferred to blow off the steam either at the close of the digestion or following the distillation step, into another digester which has been freshly charged. This is accomplished by opening the valve 19, when the steam, together with any volatile matters carried thereby, will pass through the pipes 18 and 15, and conduit 14, flowing thence to other digesters through the inlet-pipe 16 thereof. If desired a portion of the vapors may be discharged into the air through the blow-off cock 4 and pipe 5, in order to economize time or to avoid the gradual accumulation, in successively-operated digesters, of such volatile products as may be objectionable either in the digestion or in the subsequent fermentation. In case non-resinous woods are treated the step of distillation is of course omitted but the operation may be otherwise essentially as above described. The preliminary steaming of the wood is advantageous in any case, in conjunction with the supply of the hydrolyzing agent at a lower temperature, as assuring the increased penetration above described.

It is to be understood that the conditions above recited relating to the nature and proportion of hydrolyzing agent used, the temperatures and pressures employed, and the time of the operation, are to be regarded as illustrative, and may be varied within rather wide limits, depending upon the character of the raw material, the scale of operations, and other factors. Furthermore, the conditions, as regards concentration and quantity of acid, time and temperature of heating, are to a considerable degree convertible factors, and may therefore be varied with mutual correlation within comparatively wide limits.

The process herein referred to is described in my copending application Ser. No. 674,166, filed January 29, 1912.

I claim:

1. Apparatus for treating ligno-cellulose or the like, comprising a digester mounted for rotation, means for heating the contents thereof, and means operable during the rotation of the digester for withdrawing the vapors from the digester and for distributing a hydrolyzing agent upon the surface of the charge.

2. Apparatus for treating ligno-cellulose or the like, comprising a digester mounted for rotation, means for introducing steam thereinto, and a fixed conduit extending into the vapor space of the digester for distributing a hydrolyzing agent upon the surface of the charge, said means for introducing steam and hydrolyzing agent operable during the rotation of the digester.

3. Apparatus for treating ligno-cellulose or the like, comprising a digester mounted for rotation, means for introducing steam thereinto, means for withdrawing vapors from the digester, and means extending into the vapor space of the digester for distributing a hydrolyzing agent upon the surface of the charge, all of said means operable during the rotation of the digester.

4. Apparatus for treating ligno-cellulose or the like, comprising a digester mounted for rotation, a fixed pipe or conduit extending axially therethrough and having non-communicating perforate and imperforate sections, a steam-supply connection to the perforate section, and an eduction pipe extending into the vapor space of the digester and communicating with the imperforate section.

5. Apparatus for treating ligno-cellulose or the like, comprising a digester mounted for rotation, a fixed pipe or conduit extending axially therethrough and having non-communicating perforate and imperforate sections, a steam supply connection to the perforate section, and an eduction pipe for vapors extending upwardly into the vapor space of the digester and opening thereinto, said eduction pipe supported by the axial pipe and communicating with the imperforate section thereof.

6. Apparatus for treating ligno-cellulose or the like, comprising a digester mounted for rotation, a fixed pipe or conduit extending axially therethrough and having non-communicating perforate and imperforate sections, a steam supply connection to the perforate section, and an eduction pipe for vapors arched upwardly into the vapor space of the digester and opening thereinto, said eduction pipe supported at both ends by the axial pipe and communicating with the imperforate section thereof.

7. Apparatus for treating ligno-cellulose or the like, comprising a digester mounted for rotation, a fixed pipe or conduit extending axially therethrough and having non-communicating perforate and imperforate sections, a steam-supply connection to the perforate section, and an eduction pipe for vapors extending upwardly at an angle to the vertical into the vapor space of the digester and opening thereinto, said eduction pipe supported by the axial pipe and communicating with the imperforate section thereof.

8. Apparatus for treating ligno-cellulose or the like, comprising a digester mounted for rotation, a fixed pipe or conduit extending axially therethrough and having non-communicating perforate and imperforate sections, a steam-supply connection to the perforate section, and an eduction pipe for vapors arched upwardly at an angle to the vertical into the vapor space of the digester and opening thereinto, said eduction pipe supported at both ends by the axial pipe and communicating with the imperforate section thereof.

9. Apparatus for treating ligno-cellulose or the like, comprising a digester mounted for rotation, a fixed pipe or conduit extending axially therethrough and having non-communicating perforate and imperforate sections, a steam-supply connection to the perforate section, an eduction pipe extending into the vapor space of the digester and communicating with the imperforate section, and a supply connection for hydrolyzing agent supported by said vapor-eduction pipe.

10. Apparatus for treating ligno-cellulose or the like, comprising a digester mounted for rotation, a fixed pipe or conduit extending axially therethrough and having non-communicating perforate and imperforate sections, a steam-supply connection to the perforate section, an eduction pipe extending into the vapor space of the digester and communicating with the imperforate section, and a supply connection for hydrolyzing agent within said vapor-eduction pipe.

11. Apparatus for treating ligno-cellulose or the like, comprising a digester mounted for rotation, a fixed pipe or conduit extending axially therethrough and having non-communicating perforate and imperforate sections, a steam-supply connection to the perforate section, an eduction pipe for vapors arched upwardly into the vapor space of the digester and opening thereinto, said eduction pipe supported at both ends by the axial pipe and communicating with the imperforate section thereof, and a supply connection for hydrolyzing agent supported by said vapor-eduction pipe.

12. Apparatus for treating ligno-cellulose or the like, comprising a digester mounted for rotation, a fixed pipe or conduit extending axially therethrough and having non-communicating perforate and imperforate sections, a steam-supply connection to the perforate section, an eduction pipe for vapors arched upwardly into the vapor space of the digester and opening thereinto, said eduction pipe supported at both ends by the axial pipe and communicating with the imperforate section thereof, and a supply connection for hydrolyzing agent within said vapor-eduction pipe.

13. Apparatus for treating ligno-cellulose or the like, comprising a digester mounted for rotation, and a fixed vapor-eduction pipe therein, said pipe extending into the vapor space of the digester at an angle to the vertical.

14. Apparatus for treating ligno-cellulose or the like, comprising a digester mounted for rotation, a fixed vapor-eduction pipe therein, said pipe extending into the vapor space of the digester at an angle to the vertical, and a supply connection for hydrolyzing agent supported by said vapor-eduction pipe.

15. Apparatus for treating ligno-cellulose or the like, comprising a digester mounted for rotation, a fixed vapor-eduction pipe therein, said pipe extending into the vapor space of the digester at a right angle to the surface of the material therein, and a supply connection for hydrolyzing agent supported by said vapor-eduction pipe.

16. Apparatus for treating ligno-cellulose or the like, comprising a digester mounted for rotation, a fixed vapor-eduction pipe therein, and a supply connection for hydrolyzing agent supported by said vapor-eduction pipe.

In testimony whereof I affix my signature in presence of two witnesses.

GEORGE H. TOMLINSON.

Witnesses:
C. L. EFFINGER,
J. E. MAYO.